US007728246B2

(12) United States Patent
Hanson et al.

(10) Patent No.: US 7,728,246 B2
(45) Date of Patent: Jun. 1, 2010

(54) DELIVERY POINT SEQUENCER AND METHOD OF USE

(75) Inventors: Bruce H. Hanson, Endicott, NY (US); J. Edward Roth, Lansdale, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 341 days.

(21) Appl. No.: 11/625,737

(22) Filed: Jan. 22, 2007

(65) Prior Publication Data

US 2007/0154929 A1 Jul. 5, 2007

Related U.S. Application Data

(63) Continuation of application No. 10/411,137, filed on Apr. 11, 2003, now Pat. No. 7,282,658.

(51) Int. Cl.
*G06F 7/00* (2006.01)
*B07C 5/00* (2006.01)
*G06K 9/00* (2006.01)

(52) U.S. Cl. ........................ 209/584; 209/900; 700/223

(58) Field of Classification Search ................. 209/584, 209/900

See application file for complete search history.

(56) References Cited

U.S. PATENT DOCUMENTS 3,652,078 A 3/1972 Sather et al.
3,966,186 A 6/1976 Helm
4,310,276 A 1/1982 Castagnoli
4,992,649 A 2/1991 Mampe et al.
5,287,271 A 2/1994 Rosenbaum
5,419,440 A 5/1995 Picoult
5,841,658 A 11/1998 Bouchard
6,107,588 A 8/2000 De Leo et al.
6,167,326 A 12/2000 Graushar et al.
6,241,099 B1 6/2001 Hendrickson et al.
6,269,609 B2 8/2001 Graushar et al.
6,274,836 B1 8/2001 Walach
6,303,889 B1 10/2001 Hayduchok et al.
6,347,260 B1 2/2002 Graushar et al.
6,443,311 B2 9/2002 Hendrickson et al.
6,501,041 B1 12/2002 Burns et al.
6,685,030 B1 2/2004 Mileaf
6,711,462 B2 3/2004 Flores et al.
6,741,908 B2 5/2004 Vanderbles et al.

(Continued)

*Primary Examiner*—Patrick Mackey
*Assistant Examiner*—Mark Hageman
(74) *Attorney, Agent, or Firm*—Leland Schultz; Roberts Mlotkowski Safran & Cole, P.C.

(57) ABSTRACT

Device for sequencing disparate products, includes at least a first feeder mechanism feeding a first separate stream of a first product type in a pre-sequenced order. At least a second feeder mechanism feeds a second separate stream of second product type though a sequencing process. At least one reading device reads product information of the first product type and the second product type. A pausing device pauses, on one of the first feeder mechanism and the second feeder mechanism, one of the first separate stream of the first product type in the pre-sequenced order and the second separate stream of the second product type in a first pass sort order of the sequencing process based on the information read from the at least one reading device to enable the first product type and the second product type to be intermixed into a stream forming a merged stream of sequenced first and second product type.

13 Claims, 4 Drawing Sheets

U.S. PATENT DOCUMENTS

| | | | |
|---|---|---|---|
| 6,748,294 | B1 | 6/2004 | Overman et al. |
| 6,762,384 | B1 | 7/2004 | Kechel |
| 7,060,926 | B2 | 6/2006 | Edmonds |
| 7,096,088 | B2 | 8/2006 | Graushar et al. |
| 7,145,094 | B2 | 12/2006 | Oexle et al. |
| 2004/0007510 | A1 | 1/2004 | Kechel |
| 2004/0173958 | A1 | 9/2004 | Graushar |

FLATS SEQUENCE SORTER WITH THREE ADDED DPS MODULES

DELIVERY POINT SEQUENCER AND METHOD OF USE

CROSS-REFERENCE TO RELATED APPLICATIONS

The present application is a continuation of U.S. application Ser. No. 10/411,137 filed Apr. 11, 2003, the disclosure of which is expressly incorporated by reference herein in its entirety.

BACKGROUND OF THE INVENTION

1. Field of the Invention

The present invention generally relates to a sequencing device and, more particularly, to a delivery point sequencing device for sequencing separate streams of products such as letters and flats and a method of use.

2. Background Description

The sorting of mail is a very complex, time consuming task. In general, the sorting of mail is processed though many stages, including back end processes, which sort or sequence the mail in delivery order sequence for each carrier route. These processes can either be manual or automated, depending on the mail sorting facility, the type of mail be sorted such as packages, flats, letter and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs.

In one type of automated process, a two pass automated process may be used for sequencing mail pieces in delivery order for each carrier route. These systems may be used individually for letters or flats or other packages, but merging disparate products such as flats and letters in an efficient manner so as to produce a sequenced mixed mail stream that groups letters and flats separately for each delivery point has yet to be solved.

In a two pass process, for example, the mail pieces are first provided in random order prior to being sequenced. In the first pass, the mail pieces are separated into groups by delivery point (i.e., specific sets of carrier routes), but in no specific order or sequence. In further passes, the groups of the mail pieces are sorted into a delivery sequence order. By way of one example, directions are assigned to a set of delivery points. Taking four directions with 16 delivery points as an example, a first pass may assign the following directions to each delivery point:

| | | | | |
|---|---|---|---|---|
| Direction #1 | 1 | 5 | 9 | 13 |
| Direction #2 | 2 | 6 | 10 | 14 |
| Direction #3 | 3 | 7 | 11 | 15 |
| Direction #4 | 4 | 8 | 12 | 16 |

That is, in the 1st row (direction 1) there are delivery points for 1, 5, 9 and 13. In the 2nd row, (direction 2) there are delivery points for 2, 6, 10 and 14. In the 3rd row (direction 3), there are delivery points for 3, 7, 11 and 15. Lastly, in the 4th row (direction 4), there are delivery points for 4, 8, 12 and 16.

However, these sets of delivery points are only now grouped according to carrier route, but are not in a delivery sequence, i.e., in any particular order or sequence within that group. To properly sequence the mail pieces in delivery order, a second pass or sorting process must be performed on the mail pieces. In doing so, it is possible to reassign the delivery points to the directions in the following manner, for example,

| | | | | |
|---|---|---|---|---|
| Direction #1 | 1 | 2 | 3 | 4 |
| Direction #2 | 5 | 6 | 7 | 8 |
| Direction #3 | 9 | 10 | 11 | 12 |
| Direction #4 | 13 | 14 | 15 | 16 |

Now, each direction includes a sequenced set of delivery points. That is, direction 1 includes a sequenced order of delivery points for 1, 2, 3 and 4. Direction 2 includes a sequenced order of delivery points for 5, 6, 7, and 8. Direction 3 includes a sequenced order of delivery points for 9, 10, 11 and 12. Lastly, direction 4 includes a sequenced order of delivery points for 13, 14, 15 and 16.

But, current systems are not capable of merging, in sequential delivery order, different types of mail pieces. For example, there is no known system which is capable of merging in sequential delivery order both flats and letters. To accomplish this task, the letters and flats, for example, must first be separately sequenced according to carrier route through a two or more pass system. Then, the sequenced letters and flats must be merged, manually. In the manual process, a skilled worker will separate each group of letters for a single delivery point and each group of flats for a single delivery point and merges them together to form a single sequential delivery order of both letters and flats.

The present invention is directed to overcoming one or more of the problems as set forth above.

SUMMARY OF THE INVENTION

In a first aspect of the present invention, a device for sequencing disparate products includes at least a first feeder mechanism feeding a stream of a first product type in a pre-sequenced order. At least a second feeder mechanism feeds a stream of second product type though a sequencing process. A reading device reads product information of the first product type and the second product type. A pausing device pauses the first stream of the first product type or the second stream of the second product type in a first pass sort order of the sequencing process based on the information read from the reading device. The first product type and the second product type are intermixed into a stream forming a merged stream of sequenced first and second product type.

In a second aspect of the present invention, a sequencing method includes providing a first type of product in a pre-sequenced order and sorting a second type of product through a first pass sort into delivery groups. The method includes sequencing the second type of product associated with a group of the delivery groups. The first type of product associated with the group is intermixed into a stream of the second type of product associated with the group during the sequencing step to form a merged sequential order of the first type of product and the second type of product at a destination point.

In another aspect of the present invention, a sequencing method includes providing a first type of product in a pre-sequenced order and passing a second type of product through a two pass sort to sequence the second type of product. The first type of product in the pre-sequenced order is intermixed with the second type of product during the second pass sort of the second type of product. The second type of product forms a merged sequential stream, in a delivery point sequence, with the first type of product.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EMBODIMENTS OF THE INVENTION

The present invention is directed to a sequencing device and more particular to a device capable of sequencing products such as, for example, flats and other mail items (i.e., letters), into a merged, sequenced stream of intermixed product for future delivery or warehousing or the like. In aspects of the present invention, the sequencing device is capable of providing separate streams of flats and pre-sequenced letters into a sequenced stream for delivery by a mail carrier for a specific mail carrier route. The system and method of the present invention significantly reduces processing times for sequencing and merging both flats and letter pieces or other disparate products in delivery point sequence using, in embodiments, parallel processing. Other applications such as warehousing and storage applications are also contemplated for use with the present invention.

System of the Present Invention

Figure 1:
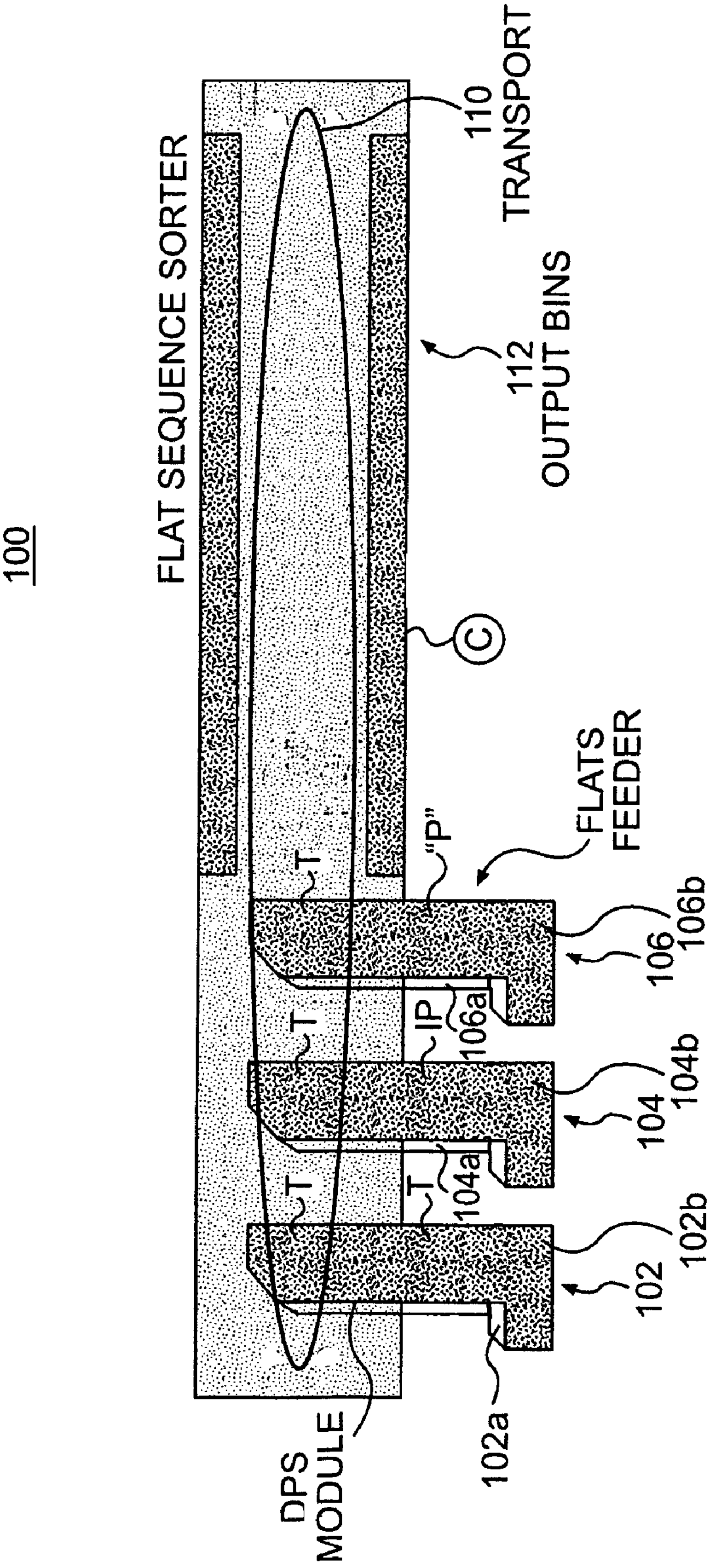
FIG. 1 shows a general schematic diagram of the sequencing device of the present invention.

Referring now to FIG. 1, a general schematic diagram of the sequencing device of the present invention is shown. In the embodiment of FIG. 1, the sequencing device is generally depicted as reference numeral 100 and includes three feeding devices 102, 104 and 106. In embodiments, the feeding devices including letter feeders 102*a*, 104*a* and 106*a* each with a feed rate capacity of approximately 40,000 letters per hour and flats feeders 102*b*, 104*b* and 106*b* with a feed rate capacity of approximately 10,000 flats per hour. In embodiments, the flat feeders 102*b*, 104*b* and 106*b* may include pause devices "P" as well as inserters "I". The pause devices are used to pause the stream of flats or other types of products while the other products are being inducted from the other feeders 102*a*, 104*a* and 106*a*. Those of ordinary skill in the art should recognize, though, that other types of feeders and feeding capacity rates and combinations thereof may also be used with the present invention, and that the feeding devices 102, 104 and 106 are provided for showing an exemplary description of the present invention. It should further be recognized that two or more than three feeders may also be used with the present invention.

Referring still to FIG. 1, a conventional type transporting system 110 is provided for transporting both flats and letters or other disparate products between the feeders 102, 104 and 106 and output bins 112. In aspects of the present invention, the flats and letters will be inducted from the respective feeders 102, 104 and 106 and transported to any number of the output bins 112 via the transporting system 110. In further embodiments, a grouping of output bins 112 may be designated for any number of respective carrier routes or groupings of mail pieces for future delivery order. The output bins 112 and the transporting system 110 may equally be used for other products for future warehousing, storage and the like. The system may be controlled by controller "C" to implement the controls and method of the present invention, as discussed below.

Figure 2:
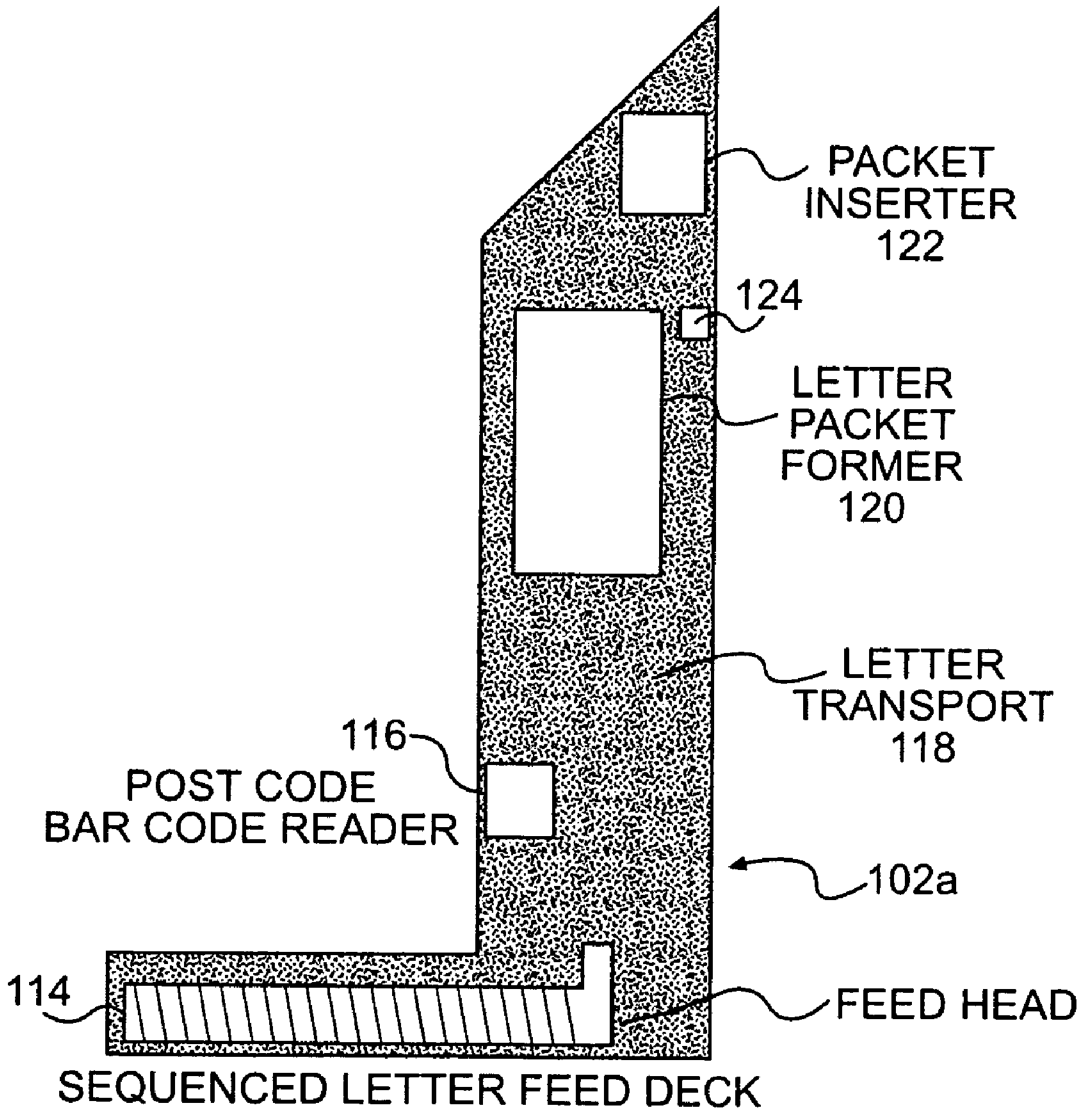
FIG. 2 shows a general schematic diagram of a letter sequencer or feeder device used with the present invention.

FIG. 2 is a general schematic diagram of one of the feeders 102*a*, 104*a* or 106*a* used in the implementation of the present invention. For discussion, the feeder 102*a* will be discussed and assumed to be a letter feeder, but may equally be a different type of feeder or delivery point sequencer (DPS). The feeder includes a sequenced feed deck 114 and a camera, optical reading device, bar code reader or other type of reading device 116. In embodiments, the reading type device 116 may be mounted to the feeder, but may be located near or proximate to the feeder, as well. The reading device 116 is designed to read the delivery point or other pertinent product information provided on each product.

In aspects of the present invention, the products such as letters, after second pass thereof, is provided in a pre-sequenced order from either highest order to lowest order or vice versa. The sequenced feed deck 114 transports the pre-sequenced product such as letters to a transport 118 portion of the feeder. At this stage, in aspects of the present invention, the product may be packetized using a packet former 120. The packet former 120 may collect the letters or other mail pieces or other product having a same destination information (delivery address) or same product information into a packet, up to a maximum total packet thickness. The maximum packet thickness may be based on the maximum thickness that can be transported within the transporting system 110 or the maximum thickness of a flat. More than one packet may be formed for the same delivery point, if necessary. The packet is then transported to a packet inserter 122, which inducts the packet onto the transporting system 110.

In embodiments, the feeder also includes a pause device 124, which is capable of pausing: (i) the stream of product starting with the product that has different destination information than that of the product being formed into the packets, or (ii) the formed packet until it is the appropriate time to induct the packet in the mail or product stream so that the packet and the product inducted from the other feeders are in sequential order (as discussed below).

The pause device may be downstream of the reading device 116. This allows the pause device to pause or stop the product based upon the information associated with the bar code or other information such as area code and the like (i.e., delivery point address) of each individual product or packet.

Method of Sequencing Product Using the System of the Present Invention

Hereinafter, the present invention will generally be described with the implementation of letters and flats, but it should be understood that the letters and flats may be any different type of products such as a first type of product and a second type of product. The method of the present invention may be used for a single carrier route at a time, multiple routes at once or for warehousing or other sequencing needs of disparate products. In the aspects of the present invention, the DPS provides a control for merging pre-sequenced letters into a sequenced stream of flats based on a two pass sort system. The same underlying concept can also be implemented in other known sort processing systems, and should thus not be limited to only a two pass sort system. The two pass sort is provided as one aspect of the present invention to more readily describe the advantages of the present invention.

Figure 3:
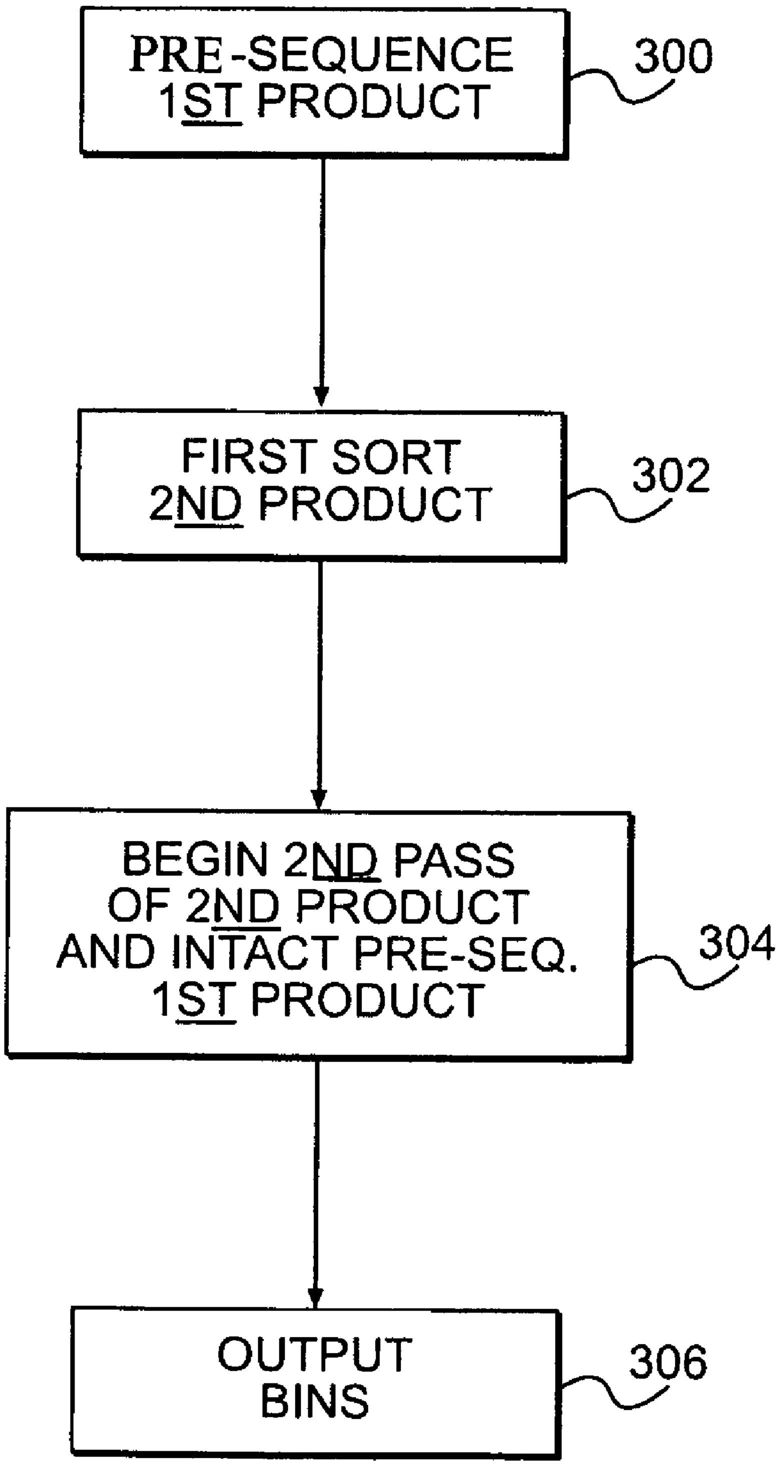
FIG. 3 is a flow diagram showing steps implementing the method of the present invention.
Figure 4:
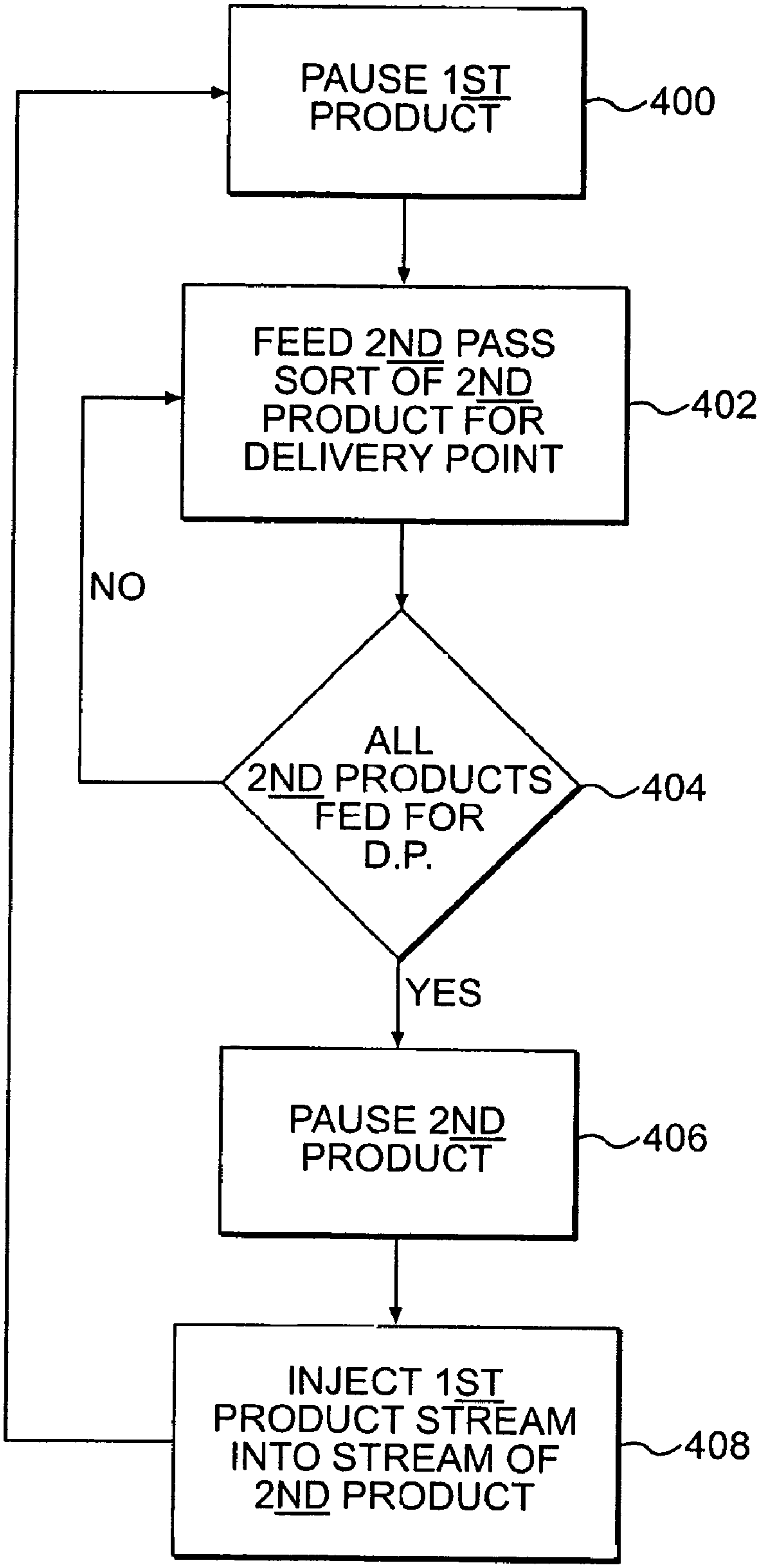
FIG. 4 is a flow diagram implementing steps of FIG. 3.

Reference is now made to FIGS. 3 and 4 showing the steps of implementation of the present invention. FIGS. 3 and 4 are representative flow diagrams and the steps thereof may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). FIGS. 3 and 4 may equally represent a high level block diagram of the system of the present invention, implementing the steps thereof.

In particular, in step 300, the letters are pre-sorted into a sequential order for delivery using, for example, a two pass sort. In step 302, the flats are first pass sorted. During the second pass of the flats, the pre-sequenced letters are inducted into the stream of the flats (step 304). The output is a sequentially merged group of letters and flats for each delivery point, using only two passes for the flats. In this manner, the flats only pass through the flat feeder two times, thus reducing or minimizing damage to the flats. In embodiments, the letters for each address of the delivery points may be packetized prior to being inducted into the flat stream during the second pass thereof. The sequenced and merged flats and letters are then provided into the output bins in step 306. The letter feeder and the flat feeder, as now can be recognized by those of skill in the art, work in conjunction with one another (i.e., pausing and starting) to inject the letters and flats into a sequential, merged stream.

More specifically, in step 300, the letters may be run through the sorting device twice, i.e., the two-pass method. In the first pass, the letters are sorted such that the first bin includes, in a mixed or non-ordered manner, the first delivery point for each piece of mail or product for the respective bin that will be filled during the second pass and so on. In aspects of the present invention, the first pass may group the letters in each bin by delivery point sequence number for second pass and additionally group the mail or product into the first pass bins by specific sets of carrier routes. The grouping of the first pass bins by groups of carrier routes allows each feeder, on second pass, to process its own set of carrier routes, allowing all feeders to operate in parallel during second pass. This increases the second pass throughput. This same process, for first pass, may also be utilized for the flats.

In one embodiment, when letters from the first bin is processed during second pass, it is distributed, as addressed, to the appropriate second pass bin as the first set of letters entering each bin, in sequence. Similarly, when letters from the second first-pass bin is processed during second pass, it is distributed, as addressed, to the appropriate second pass bin as the second set of letters entering each bin, and so on. In this way, following second pass, the $1^{st}$ bin, for example, will include delivery points 1 to X in sequence. Similarly, following second pass, the $2^{nd}$ bin will include delivery points X+1 to Y in sequence, etc.

After fully sequencing the letters and first pass sorting the flats, the methodology of the present invention will begin to process the flats in second pass in step 304. That is, the pre-sequenced letters are intermixed into the stream of flats during the second pass process of the flats resulting in, after the second pass sort of the flats, a merged stream of letters and flats, each grouped for each address in a carrier group in sequence. Each mail or product grouping follows one another, in sequence.

To illustrate this exemplary embodiment, four second pass bins are assigned to a specific flat feeder. During the first pass:

1. The first first-pass bin receives mail or product in any mix for the following delivery points: 1, 5, 9, 13. This is the bin sorted first during second pass.

2. The second first-pass bin receives mail or product in any mix for the following delivery points: 2, 6, 10, 14. This is the bin sorted second during second pass.

3. The third first-pass bin receives mail or product in any mix for the following delivery points: 3, 7, 11, 15. This is the bin sorted third during second pass.

4. The fourth first-pass bin receives mail or product in any mix for the following delivery points: 4, 8, 12, 16. This is the bin sorted fourth during second pass.

Of course this same or similar process may be used with more or less than four second pass bins. The sequenced letter stream is merged into the flat mail in a sequence in the same delivery point groups as the first pass flats starting the second pass. As flats are processed into the flat feeder during second pass, the first flat mail piece encountered in each new grouping is identifiable since the delivery points are pre-assigned for each grouping.

Now, after sorting all mail or product pieces assigned to, for example, the 1, 5, 9 and 13 delivery points, the first mail piece from the second group is encountered, which could be destined for either the 2, 6, 10 or 14 delivery point. Upon encountering the first flat piece in each new grouping, it is assured that all flat mail pieces in the previous grouping have been inducted and are at least on the way to second pass sort. When the flat feeder encounters a new set of delivery points, flat induction is paused, and the letters or packets are sorted to the previous group of delivery points. Pausing flat mail induction at this point, all letter mail belonging to the same group of delivery points just processed can now be inducted, effecting a grouping of flats, then a grouping of letters, for each delivery point. It should be recognized by those of ordinary skill in the art that all mail or other type of product going to a specific set of delivery points is contained within the grouping. This same process may then used for the remaining groups.

FIG. 4 shows further steps implementing the method of the present invention. The steps of FIG. 4 may be used with the example provided above, or other illustrative examples. In particular, in step 400, the stream of letters or packets of letters (i.e., 1.sup.st type of product) are paused on the feeder. In step 402, the flats (2.sup.nd type of product) for a set of delivery points are fed through the system for a second pass sorting. In step 404, a determination is made as to whether all of the flats for the set of delivery point are completely fed through the system. If not, step 402 continues. If step 404 is affirmative, the flat induction is paused in step 406. The pre-sequenced stream of letters or packets for each delivery point is then fed to the previous group of flat delivery points in step 408. Pausing flat mail induction at this point, allows all letter mail belonging to the same group of delivery points just processed to form a group with the second pass sorted flats for each delivery point. This process continues until the entire product is sequenced. The result is flats for each delivery point followed by letters for each delivery point, in sequence in the manner they will be delivered.

While the invention has been described in terms of preferred embodiments, those skilled in the art will recognize that the invention can be practiced with modification within the spirit and scope of the appended claims.

What is claimed:

1. A sequencing method, comprising the steps of:

providing a first type of product in a sequenced order;

sorting a different second type of product through a first pass sort into delivery groups;

sequencing the second type of product associated with a group of the delivery groups;

intermixing the first type of product associated with the group into a stream of the second type of product associated with the group during the sequencing step of a sequencing device to form a merged sequential order of the first type of product and the second type of product at a destination point; and transporting the merged sequential order of the first type of product and the second type of product from a plurality of feeder mechanisms to a plurality of output bins.

2. The sequencing method of claim 1, further comprising the step of pausing the second type of product upon encountering another group of the delivery groups prior to the intermixing step.

3. The sequencing method of claim 1, wherein the intermixing step includes providing the sequenced first type of product associated with the group into the stream of the second type of product during a second pass sort of the second type of product.

4. The sequencing method of claim 1, further comprising the step of reading product information from the sequenced first type of product and the second type of product during a second pass sort of the second type of product and prior to the intermixing step.

5. The sequencing method of claim 1, wherein the merged sequential order is a delivery order for each group of the delivery groups.

6. The sequencing method of claim 1, further comprising the step of packetizing the first type of product having same product information for the group prior to the intermixing step.

7. The sequencing method of claim 1, further comprising:

feeding the first type of product through one portion of a sequencing device; and feeding the second type of product through another portion of the sequencing device.

8. The sequencing method of claim 1, wherein the method utilizes parallel processing to merge and sequence the first type of product and the second type of product into a delivery point sequence.

9. A sequencing method, comprising the steps of:

providing a first type of product in a sequenced order;

passing a second different type of product through a two pass sort to sequence the second type of product; and intermixing the first type of product in the sequenced order with the second type of product during the second pass sort of the second type of product in a sequencing device such that the second type of product forms a merged sequential stream, in a delivery point sequence, with the first type of product.

10. The sequencing method of claim 9, further comprising the step of packetizing the first type of product into delivery segments based on the pre-sequenced order prior to the intermixing step.

11. The sequencing method of claim 9, further comprising the step of operating feeders for the first product type and the second product type in parallel such that on the second pass sort each feeder processes its own set of carrier routes in a delivery sequence with the first type of product and the second type of product.

12. The sequencing method of claim 9, further comprising:

feeding the first type of product through one portion of the sequencing device; and feeding the second type of product through another portion of the sequencing device.

13. The sequencing method of claim 9, further comprising:

pausing the second type of product on a second feeder mechanism while the first type of product is inducted onto a transporting system from a first feeder mechanism; and transporting the merged sequential stream from the first and second feeder mechanisms to output bins.

* * * * *